United States Patent [19]
Hirata et al.

[11] Patent Number: 5,948,123
[45] Date of Patent: Sep. 7, 1999

[54] COLORING METHOD FOR HIDES

[75] Inventors: Junichi Hirata, Gifu-ken; Hiroko Hasegawa, Aichi-ken, both of Japan

[73] Assignee: Retug, Inc., Roslyn, N.Y.

[21] Appl. No.: 09/064,252

[22] Filed: Apr. 22, 1998

[30] Foreign Application Priority Data

Apr. 23, 1997 [JP] Japan ................................. 9-121707

[51] Int. Cl.$^6$ .................................................. D06P 3/04
[52] U.S. Cl. ........................... 8/404; 8/436; 8/94.1 R; 8/94.11; 8/161; 8/94.19 R
[58] Field of Search ................... 8/404, 436, 94.1 R, 8/94.11, 161, 94.19 R

[56] References Cited

U.S. PATENT DOCUMENTS

| | | | |
|---|---|---|---|
| 2,477,752 | 8/1949 | Kiss ................................................. | 8/404 |
| 4,214,490 | 7/1980 | Chizek ............................................. | 81/9.22 |
| 4,286,599 | 9/1981 | Hahn et al. ...................................... | 128/316 |
| 4,392,493 | 7/1983 | Niemeijer ........................................ | 128/316 |
| 4,440,078 | 4/1984 | McCrery, Jr. et al. ......................... | 101/4 |
| 4,488,550 | 12/1984 | Niemeijer ........................................ | 128/316 |
| 4,719,825 | 1/1988 | LaHaye et al. .................................. | 81/9.22 |
| 5,445,611 | 8/1995 | Eppstein et al. ................................ | 604/49 |

FOREIGN PATENT DOCUMENTS

| | | |
|---|---|---|
| 6395 | 1/1980 | European Pat. Off. . |
| 1806573 | 4/1993 | U.S.S.R. . |
| 2 054 340 | 2/1981 | United Kingdom . |

OTHER PUBLICATIONS

English language translation of Wang, CN 1117342, pp. 1–4, Feb. 1996.

"Tattoing A to Z" by Huck Spaulding, 1988, Spaulding and Rogers Mfg. Inc., pp. 7 and 140.

"Irezumi [Tatooing]" by Mitsuo Sugawara, Gendai Hifu–ka Taikei [Modern Dermatology Outlines], 17:313–324, 1984, Nakayama–shoten, Japan.

*Irezumi no Jinrui–gaku (Anthropology of Tatooing)*, by Ikuo Yoshioka, 1996, Yu–sankaku Publishing Co., Tokyo, Japan, title page only.

Sharphouse, J.H. The Leatherworker's Handbook. Leather Producers' Association, 1963, pp. 4–5 and 22.

*Primary Examiner*—Yogendra Gupta
*Assistant Examiner*—Caroline D. Liott
*Attorney, Agent, or Firm*—Pennie & Edmonds LLP

[57] ABSTRACT

A coloring method, wherein coloring agent or pigment is injected into active cells of an animal hide before the hide is harvested, and a coloring agent injection device with one or more needles, which are injected into the active cells of the hide of an animal whose hide is to be harvested. The coloring agent becomes fixed in the active cells of the hide, which ingest and spread said coloring agent.

10 Claims, 2 Drawing Sheets

COLORING METHOD FOR HIDES

FIELD OF THE INVENTION

The present invention relates to a method of coloring the hide of an animal such as a mammal by injecting and fixing a pigment in the hide.

BACKGROUND

There are well known coloring methods for hides in the prior art. In these methods, an animal such as a mammal is skinned and the harvested hide is tanned and softened. After tanning, the hide to be colored is either immersed in a dyebath and dyed a single color, or a pattern is used to print a coloring agent on the hide. In both cases, the hide is colored by dyeing the hide to be colored so that the pigment in the coloring agent is absorbed by the hide to be colored.

In the methods of the prior art, the coloring agent usually permeates the hide to be colored and merely remains there. It is not sufficiently fixed in the cell tissue. The pigment tends to come off when touched or exposed to light, air, water, or gas. As a result, products made from these hides tend to fade or become discolored. Even when colored evenly, the coloration of these products also lack clarity and depth.

SUMMARY

The present invention relates to a coloring method for hides which method provides superior pigmenting and fixing properties. In this coloring method, a coloring agent is injected and permeates active cells of the hide of an animal before the hide is harvested from the animal. In this method, the phagocytosis of the active cells is utilized to fix the pigment of the coloring agent in the cell tissue.

The pigment of the coloring agent enters the cytoplasm when injected in the hide and permeates the tissue via the capillary vessels. When foreign matter invades an active cell, it is engulfed and ingested inside the cell. This process is known as phagocytosis. Most of the invading pigment is ingested inside the cell itself and, as a result, remains in the cell for an extended period of time. By the time the animal is butchered and skinned for its meat and hide, the pigment has already permeated and been fixed in the harvested hide.

In an alternative embodiment of the present invention, a coloring agent injection device with one or more needles is used to implant the coloring agent. This device is used to place the coloring agent at different locations in the hide. The surface of the hide is broken by one or more needles of the coloring agent injection device. The coloring agent is then applied from the tips of the needle(s) inside the hide. In this method, the coloring agent is injected from the needle(s) only once at multiple locations.

BRIEF DESCRIPTION OF THE DRAWINGS

Reference is next made to a brief description of the drawings, which are intended to illustrate the method of the present invention. The drawings and detailed description which follow are intended to be merely illustrative, and are not intended to limit the scope of the invention as set forth in the appended claims.

DETAILED DESCRIPTION OF THE INVENTION

The following is an explanation of the preferred embodiment of the present invention with reference to the drawings.

Figure 1:
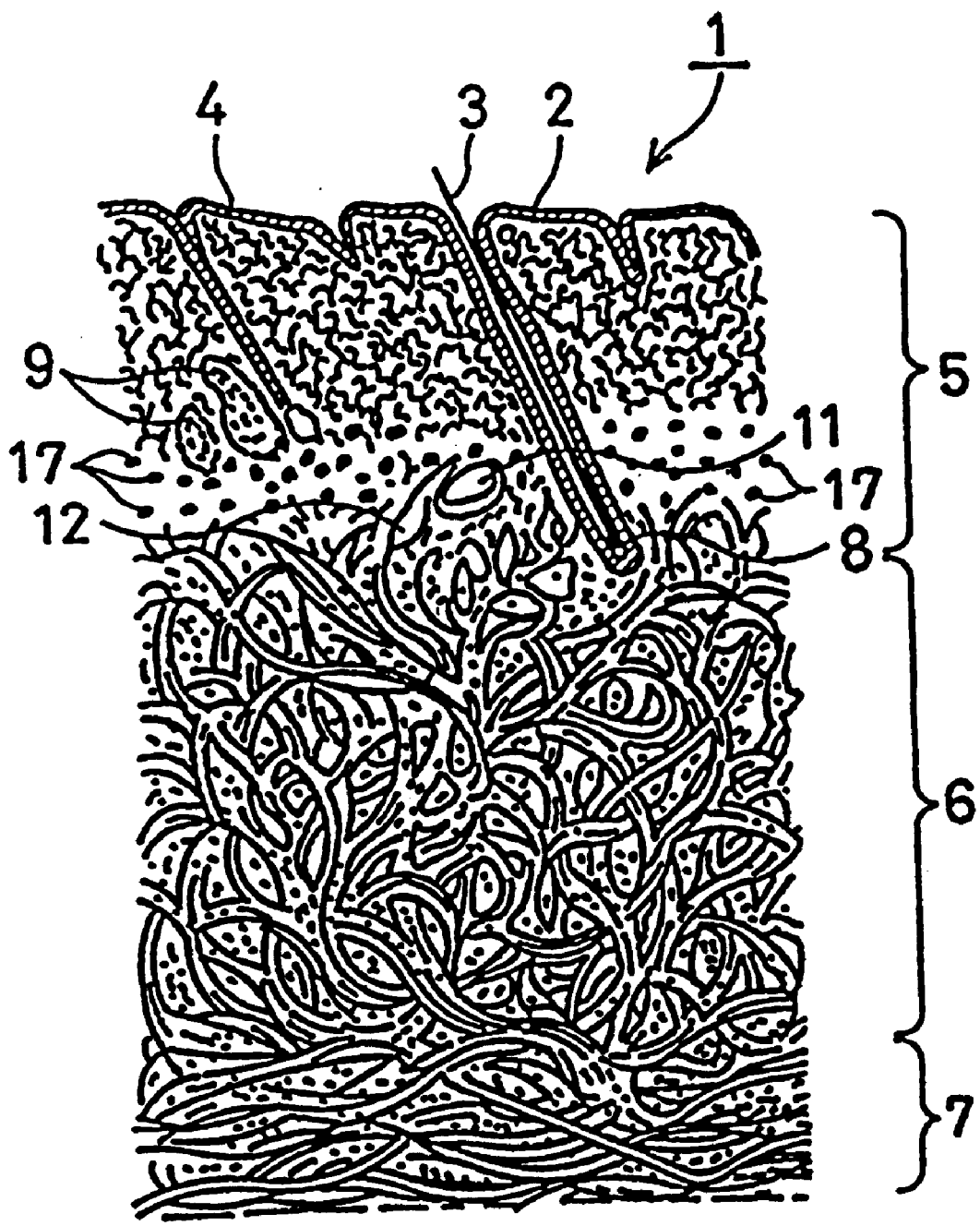
FIG. 1 is a partially enlarged cross-sectional view, showing the injection of a coloring agent into the grain layer of an animal using an injection device according to the preferred embodiment of the present invention.

First, animal 1 whose hide is to be harvested is prepared for coloring. In the methods of the prior art, the hide is colored after the animal has been skinned. Here, mammals such as cows, calves, pigs, sheep, goats, and horses are themselves colored. In other words, active cells of the mammals are colored before they are skinned. The structure of mammalian skin is nearly identical regardless of the species. In the case of a cow, hide 2 comprises, from top to bottom in FIG. 1, hair 3, epidermis 4, grain layer (also known as the papillate layer) 5, reticular layer 6, and muscular layer 7. Hair follicles 8, sweat glands 9, arteries 11, and veins 12 are located in the border region between grain layer 5 and reticular layer 6. When hide 2 is harvested, the portion from epidermis 4 to muscular layer 7 is skinned from animal 1.

Figure 2:
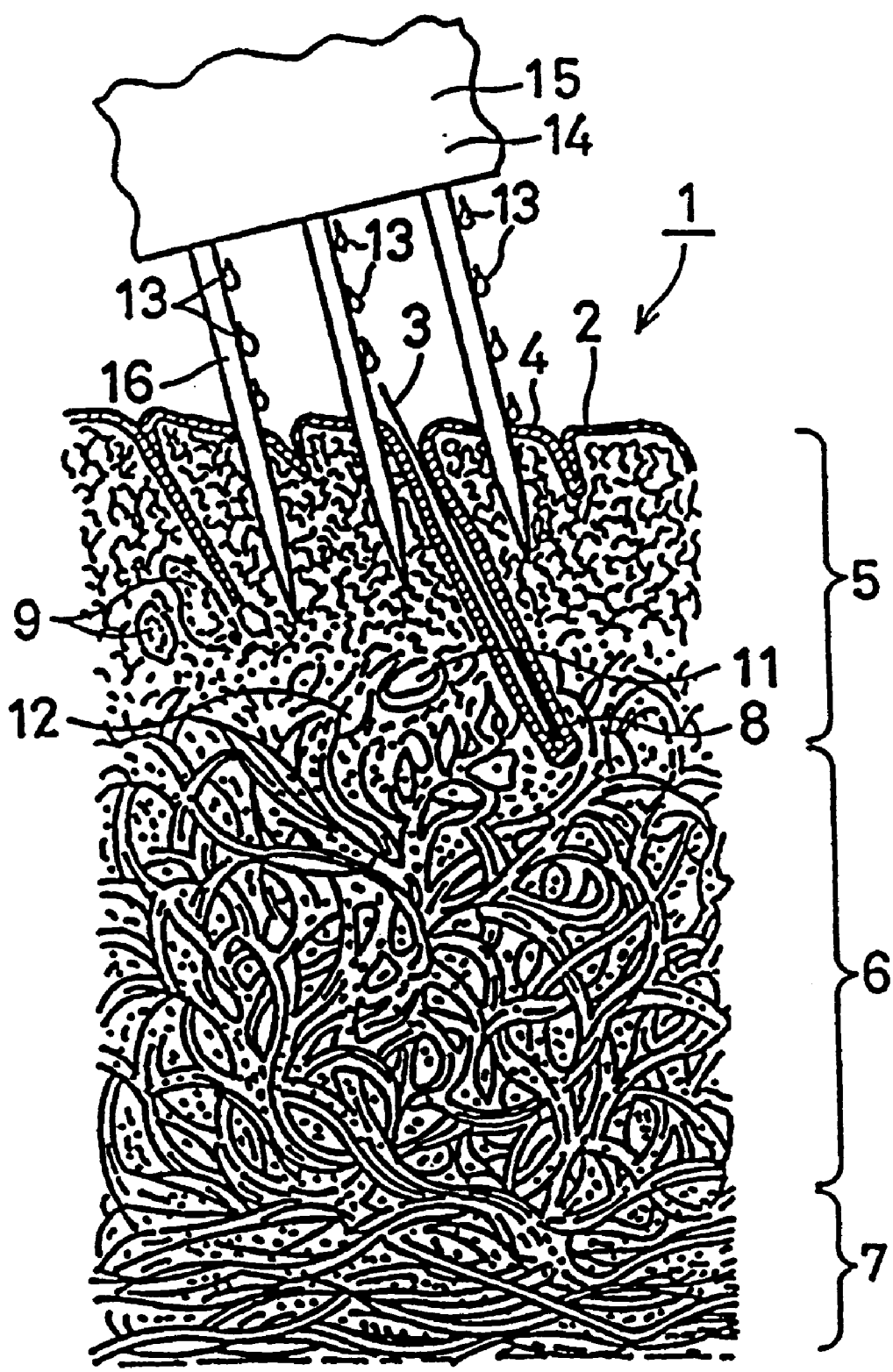
FIG. 2 is a partially enlarged cross-sectional view, showing the permeation and fixing of the pigment in the coloring agent according to the preferred embodiment of the present invention.

Next, as shown in FIG. 2, coloring agent 13 and coloring agent injection device 14 (hereinafter referred to as the injection device) are prepared. Coloring agent 13 is chemically stable and does not irritate or otherwise harm the active cells in animal 1 whose hide is to be harvested. This coloring agent 13 is fixed in the grain layer 5 and reticular layer 6 to properly adjust the color of the hide. Coloring agent 13 comprises one or more pigments that are known in the art. These pigments are applied as a liquid or in a solution. Ethanol is commonly used as a solvent for pigment solutions. The concentration of pigment in the solution depends on the particular pigment and the shading of the color desired.

Examples of yellow coloring agents 13 include cadmium yellow (cadmium sulfide or CdS) ocher, and ginger yellow. Examples of red coloring agents 13 include cinnabar (mercuric sulfide or HgS), cadmium red (cadmium selenide or CdSe), and sienna (ocher). Examples of green coloring agents 13 include chrome sulfate (chrome green), chromium sesquioxide/hydroxide (guinette green), malachite green, lead chromate, ferrous cyanate, ginger green, and phthalocyanin pigments (yellow coal-tar pigments with copper salts). Examples of black coloring agents 13 include carbon, iron oxide, logwood, and mercuric disulfide ($Hg_2S$). An example of a blue coloring agent 13 is aluminum cobalt (azure blue). Examples of white coloring agents 13 include titanium dioxide and zinc oxide. An example of a purple coloring agent 13 is manganese purple. The present invention is not restricted to these materials. Other materials known in the art may also be used as coloring agents.

Injection device 14 comprises a tank 15 for the liquid coloring agent 13, a series of bundled needles 16 connected to the tank 15 (three of which are shown in FIG. 2), and a rotating drive source, such as an electric motor, to extend and retract needles 16. To apply the coloring agent 13, needles 16 are inserted into the grain layer 5 of hide 2.

The depth of insertion depends on the thickness of the hide, which in turn depends on the type of animal used. This depth is typically very shallow and ranges from approximately 0.1 mm to approximately 3 mm. Insertion depths that are much greater than this range may cause damage, such as scarring, to the hide. Both the depth of needle insertion and the angle of insertion affect shades of color and the spreading of the color in hide 2. When needles 16 have been inserted in the appropriate areas of the hide, coloring agent 13 is discharged from tank 15 and applied to those areas of the hide.

To prepare the hide for coloring, hair 3 on animal 1 is shaved in those areas where coloring agent 13 is to be applied. Optionally, these areas may be cleaned before coloring 13 is applied. Usually there are areas on hide 2 where coloring agent 13 is to be applied and areas where coloring agent 13 is not to be applied. Areas to which coloring agent 13 is applied include (a) the minimum area required to produce the final leather product, (b) areas where needles 16 on injection device 14 can be easily applied, and (c) areas where the pigments in the coloring agent 13 can be easily fixed. This method is optimally applied, although not limited, to the soft tissue areas of the animal. In cows, for example, the tissue in the thigh area is tough while the tissue in the shoulder and abdomen area is soft. It is easier to work on these soft areas because less force will be required to insert the needles in the soft areas, as opposed to the hard areas. The design, chromogenicity, and fixation of pigments will depend on the type of hide used.

Animal 1 whose hide is to be harvested is anesthetized as required, and then moved into place. Bundled needles 16 of implementation device 14 are applied evenly to the desired location on hide 2. The arrangement of needles 16 depends on the design required. For detailed patterns having a variety of colors, needles 16 may be bundled very closely together. On the other hand, for simple patterns or single color designs, the needles 16 may be spaced farther apart.

Coloring agent 13 is discharged from tank 15 and allowed to shed along or flow down the outside surface of needles 16. In addition, coloring agent 13 may be applied to hide 2 through hollow needles. Needles 16 may be dipped into a container or pot of coloring agent solution and then applied to hide 2. Alternatively, as shown in FIG. 2, coloring agent 13 is stored in tank 15 prior to application, thereby advantageously eliminating the need for continuous dipping. A motor or other power source moves the needles 16 back and forth in order to puncture the epidermis 4. To avoid infection, the device 14 is sterilized before use. Once needles 16 have punctured the epidermis 4, they are extended until the tips of the needles 16 have reached the boundary region between grain layer 5 and reticular layer 6. Coloring agent 13, which travels along or within needles 16 into hide 2, is spread by the movement of needles 16, i.e., insertion into and retraction from hide 2. In this manner, coloring agent 13 is injected in grain layer 5. This operation is repeated in the same manner until coloring agent 13 has been applied to all of the desired areas. A small amount of coloring agent 13 is sufficient to color hide 2; the specific amount depends on the animal and the shading desired.

Immediately after coloring agent 13 has been injected, most of the pigment remains in the upper portion of rain layer 5. Then pigment 17 gradually travels through the capillaries to the middle portion of grain layer 5 and eventually permeates the entire grain layer 5 as shown in FIG. 2. The holes created by needles 16 also gradually become smaller and eventually disappear. It takes about a week for the traces of injection to disappear from the surface of the hide. When foreign matter invades an active cell, it is engulfed and ingested. This process is known as phagocytosis. As a result, most of the invading pigment 17 is ingested inside the cells where it remains for an extended period of time. It takes approximately 2 to 8 weeks for the pigment to become properly fixed in hide 2. Animal 1 is then butchered and skinned for its meat and hide. The hair, epidermis, and meat are removed to obtain the hide.

Pigment 17 injected in hide 2 is spread by the cells. This pigment does not come off when touched or exposed to light, air, water, or gas. As a result, the pigment in products made from these hides will not wear off and resists fading. The fixation of pigment 17 in the cellular tissue of grain layer 5 provides for clarity and depth of coloration. The coloration also seems more natural. The methods of the prior art cannot deliver these properties because the pigment is not fixed in the cellular tissue. In this manner, the present invention is able to provide a coloring method for hides with superior pigmenting and fixing properties.

The preferred embodiment of the present invention comprises application of the described method to mammals. Because hides of mammals are generally softer than other classes of animals such as reptiles, needles 16 of the injection device 14 are more easily inserted into hides of mammals.

The coloring method of the present invention can be used to produce the same wide variety of products as the coloring methods of the prior art. Examples include outerwear (coats, suits, jumpers), bags (such as handbags), briefcases, shoes, belts, and furniture (such as sofas). Hides colored with the method of the present invention can also be used to develop new products in the future.

Because the injection of coloring agent 13 into the hides 2 of animals 1 using an injection device 14 with needles 16 is simple, large equipment is unnecessary and hides can be colored at lower cost than the immersion and printing methods of the prior art.

In addition, because the injected pigment 13 does not remain in the same area but spreads over time to other areas, the grain layer 5 can be efficiently colored with a minimum number of injections.

When the coloring method of the present invention is applied to an immature animal 1 whose hide is to be harvested, the pattern may change as the animal 1 grows. Therefore, different patterns can be obtained simply by changing the butchering and skinning date.

In the preferred embodiment, the bundled needles 16 are moved back and forth using an electric motor. Therefore, large areas of hide 2 can be penetrated by needles 16 and coloring agent 13 can be applied in a short period of time, thereby providing an efficient method of coloring hides.

In addition, only a small amount of coloring agent 13 is required in this method. The exact amount depends on the type of animal used, the surface area of the hide to be colored, the condition of the hide, and the desired design. Because the amount of coloring agent 13 applied by a single needle 16 is so small, the coloring method of the present invention can handle intricate patterns and designs in one or ore colors. When a single color is being injected into hide 2, the coloring agent 13 with this color can be injected by all of the needles 16. When multiple colors are injected into hide 2, each color can be injected by different bundles of needles 16. Tanks 15 with different coloring agents can be prepared and arranged so that the different coloring agents 13 are supplied to the proper bundle of needles 16. In addition, different injection devices 14 can be prepared to inject coloring agents 13 of different colors. In this case, the different coloring agents 13 are added to the tanks 15 in the different injection devices 14. The different injection devices 14 are then used as desired to inject the various coloring agents 13. When applying an intricate pattern or design using two or more colors, single or multiple needles 16 can be used to apply the different coloring agents 13. Therefore, hides 2 can be colored as desired using the preferred embodiment of the present invention, regardless of the intricacy of the pattern or the number of colors.

Similar to the methods of the prior art, the animal whose hide is to be harvested is butchered for its meat and hide, and the hide is skinned. However, the method of the present invention is performed before the animal is butchered.

The present invention is by no means limited to the aforementioned preferred embodiment. The following variations are also possible. The needles 16 may be hollow or tubular like a hypodermic syringe. The coloring method of the present invention may also be used on animals other than mammals. An injection device 14 with multiple needles 16 may be inserted into hide 2 of animal 1 by hand or by using a special machine. If a machine is used, it may also perform the coloring process automatically.

What is claimed is:

1. A coloring method for animal hides which comprises injecting a coloring agent into the grain layer of the hide of a live animal about two to eight weeks before the hide is to be harvested from the animal; fixing the coloring agent in cell tissue of the grain layer after the injection by phagocytosis to color the hide; and then harvesting a colored hide from the animal about two to eight weeks after the injection.

2. The coloring method of claim 1, wherein one or more needles are used to inject the coloring agent into the hide of the animal.

3. The coloring method of claim 2, wherein the step of injecting a coloring agent comprises inserting the one or more needles about 0.1 mm to around 3 mm into the grain layer of the hide of the animal.

4. The coloring method of claim 3, wherein the coloring agent is injected into the grain layer of the hide of a cow.

5. The coloring method of claim 3, wherein the coloring agent is injected into the grain layer of the hide of a pig.

6. The coloring method of claim 3, wherein the coloring agent is injected into the grain layer of the hide of a sheep.

7. A coloring method for hides, comprising the steps of:

selecting an area of hide of a live animal to be colored, wherein the animal hide comprises a grain layer and active cell tissues;

inserting at least one needle into the grain layer of said area of animal hide;

injecting at least one coloring agent into said grain layer through or along the at least one needle;

fixing the coloring agent in the active cell tissues of the hide by phagocytosis; and skinning the animal of its hide after the coloring agent has been fixed.

8. The coloring method of claim 7, further comprising the step of removing hair from the area of animal hide.

9. The coloring method of claim 7, wherein the step of skinning the animal is done from about two weeks to about eight weeks after the step of injecting the at least one coloring agent into the hide.

10. The coloring method of claim 7, wherein the at least one needle is inserted to a depth of about 0.1 mm to around 3 mm in the grain layer of the hide of the animal.

* * * * *